United States Patent
Gagnon et al.

(10) Patent No.: US 8,281,359 B2
(45) Date of Patent: Oct. 2, 2012

(54) SYSTEM AND METHOD FOR MEDIA TRANSCODING AND PRESENTATION

(75) Inventors: Gregory J. Gagnon, Redondo Beach, CA (US); Ronald P. Cocchi, Seal Beach, CA (US); Dennis R. Flaharty, Shingle Springs, CA (US)

(73) Assignee: SypherMedia International, Inc., Aliso Viejo, CA (US)

( * ) Notice: Subject to any disclaimer, the term of this patent is extended or adjusted under 35 U.S.C. 154(b) by 418 days.

(21) Appl. No.: 12/539,400

(22) Filed: Aug. 11, 2009

(65) Prior Publication Data

US 2010/0037254 A1   Feb. 11, 2010

Related U.S. Application Data

(60) Provisional application No. 61/087,879, filed on Aug. 11, 2008.

(51) Int. Cl.
*H04N 7/16* (2006.01)
*H04N 7/12* (2006.01)
*H04N 11/02* (2006.01)
*H04N 11/04* (2006.01)
*H04N 7/167* (2006.01)
*H04B 1/66* (2006.01)
*G06F 11/30* (2006.01)
*G06F 12/14* (2006.01)
*G06F 7/04* (2006.01)
*G06F 12/00* (2006.01)
*G06F 13/00* (2006.01)
*G06F 17/30* (2006.01)
*G11C 7/00* (2006.01)

(52) U.S. Cl. .............. 725/141; 375/240.01; 713/189; 380/200; 726/20

(58) Field of Classification Search .............. None
See application file for complete search history.

(56) References Cited

U.S. PATENT DOCUMENTS

| 6,424,947 B1 * | 7/2002 | Tsuria et al. ............. 705/1.1 |
| 2001/0034882 A1 * | 10/2001 | Yuzawa ................. 725/13 |
| 2009/0141894 A1 * | 6/2009 | Sahdra et al. .......... 380/239 |

* cited by examiner

*Primary Examiner* — Mark D Featherstone
(74) *Attorney, Agent, or Firm* — Gates & Cooper LLP (57) ABSTRACT

A method and apparatus for presenting a media data stream complying with a broadcast encryption standard is disclosed. A dongle is removably coupleable to a rendering device, with the dongle performing transcoding so as to allow presentation of the media in a secure manner without modification of the rendering device software or hardware.

24 Claims, 6 Drawing Sheets

SYSTEM AND METHOD FOR MEDIA TRANSCODING AND PRESENTATION

CROSS-REFERENCE TO RELATED APPLICATIONS

This application claims benefit of U.S. Provisional Patent Application Ser. No. 61/087,879, entitled "SYSTEM AND METHOD FOR MEDIA TRANSCODING AND PRESENTATION," filed Aug. 11, 2008, by Gregory J. Gagnon, Ronald P. Cocchi, and Dennis R. Flaharty, which application is hereby incorporated by reference herein.

BACKGROUND OF THE INVENTION

1. Field of the Invention

The present invention relates to systems and methods for the secure presentation of media programs, and in particular to a system and method for securely processing an encrypted media stream for rendering and display.

2. Description of the Related Art

For Internet enabled devices, such as computers, there currently is very limited means of handling content that is compliant with the broadcast and security requirements of the major studios.

In order to reduce piracy, media providers, such as major motion picture studios, have levied specific standards on broadcasters to prevent signal theft and/or to place watermarking signals into the stream for active or forensic investigations. The standard computer, or computer processor-based device, is not capable of addressing these broadcast standards.

What is needed is a device that receives media data streams complying with such broadcast standards, securely processes the received streams, and securely provides such processed streams to a computer or computer processor-based device for rendering. The present invention satisfies that need.

SUMMARY OF THE INVENTION

To address the requirements described above, the present invention discloses a method, apparatus, article of manufacture, and a memory structure for transcoding a media stream complying with a broadcast encryption standard for a personal computer-based device for presentation on a display. Several embodiments of the invention are disclosed, including embodiments that utilize a dongle that is communicatively coupled to a rendering device such as a computer. In a simple embodiment in which the media data stream is received and immediately played back (without storage), the dongle receives an Internet Protocol (IP) packetized media data stream complying with the broadcast encryption standard, decrypts the media data stream to provide a decrypted media data stream, transcodes the decrypted media data stream into a rendering device compatible format, encrypts the transcoded media data stream, and transmitting the encrypted transcoded media data steam to a rendering device. The rendering device, which may be a personal computer or another device using a personal computer CPU, decrypting the encrypted transcoded media data stream, renders the transcoded media data stream, and provides the rendered transcoded media data stream to a display. The display then renders the transcoded media data stream.

In another embodiment, the system includes a storage device that can store the media program data for later playback. Such storage can support a "live pause" function and may permit the media program to be replayed before the entire media program is stored, or may be used to store the entire media program for later playback. This embodiment can be implemented by decrypting the encrypted media program data and re-encrypting it before transmission to the storage device, by transmitting the broadcast-encrypted media program data to the storage device, or by further encrypting the broadcast-encrypted media program data before storage.

In another embodiment, the system is evidenced by an apparatus for presenting a media data stream complying with a broadcast encryption standard in which the apparatus comprises a rendering device and a dongle. The dongle may be removably coupled to the rendering device, and can include a first dongle input for receiving an Internet Protocol (IP) packetized media data stream complying with the broadcast encryption standard, a decryptor having an input coupled to the first input for decrypting the media data stream to provide a decrypted media data stream at a decryptor output, a transcoder, having an input coupled to the decryptor output that is used for transcoding the decrypted media data stream into a rendering device-compatible format and providing the transcoded decrypted media data stream at a receiver output, and a security module that secures communications between the receiver and the rendering device by encrypting communications transmitted to the rendering device and decrypting communications received from the rendering device.

Performing encryption, decryption, and transcoding in the separate dongle frees the rendering device processor from performing these functions. The rendering device can then be an off-the-shelf such as an ordinary personal computer, with no modifications, and special purpose hardware and software required to support decryption, transcoding and encryption, since these operations are provided in a separate device.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
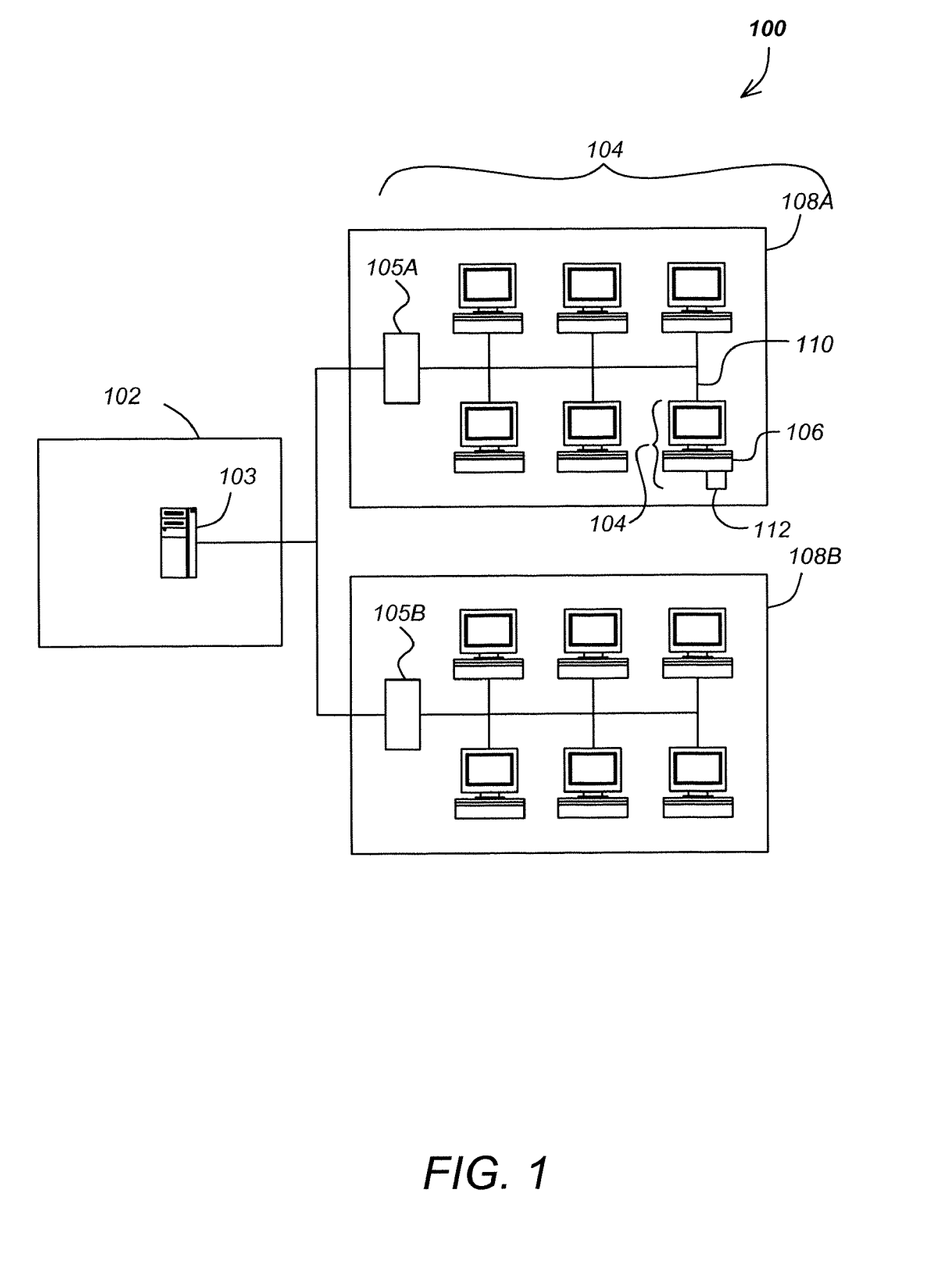
FIG. 1 is a block diagram showing an exemplary media program presentation system.

FIG. 1 is a block diagram showing an exemplary media program presentation system 100. In the illustrated embodiment, the media program presentation system 100 includes a Headend 102 that transmits packetized media data (PMD) to a one or more facilities 108A, 108B (hereinafter alternatively referred to as facilities 108). In one embodiment, the Headend 102 comprises one or more computer systems or servers 103 for storing, retrieving, encrypting, and transmitting the media program data. The transmission of the media programs to the facilities 108 may be accomplished via the Internet, by terrestrial transmission via wired or wireless means including copper or fiber optic cable, or by satellite.

Each facility comprises a plurality of presentation stations 104, which may comprise a rendering device 106 such as a personal computer and processing device 112 that is removably coupleable to the rendering device 106. In one embodiment, the processing device 112 is a dongle, which can be coupled to and removed from an external I/O port on the computer 106 so as to exchange data with the processing device 112 and/or to provide or respond to commands. The external I/O port can be a serial port, a parallel port, a USB-compliant interface, Ethernet connection, or any other means for communicating between the processing device 112. In one embodiment, the processing device may communicate with the computer 106 wirelessly, thus obviating the need for removable coupling.

The PMD can be transmitted directly to the presentation station 104, or may be transmitted to the presentation station 104 via a local receiver 105. The local receiver 105 may also store the media programs for later playback, and may remove the encryption added by the Headend 102. The local receiver 105 may also re-encrypt the PMD before forwarding it to the presentation station 104.

Figure 2:
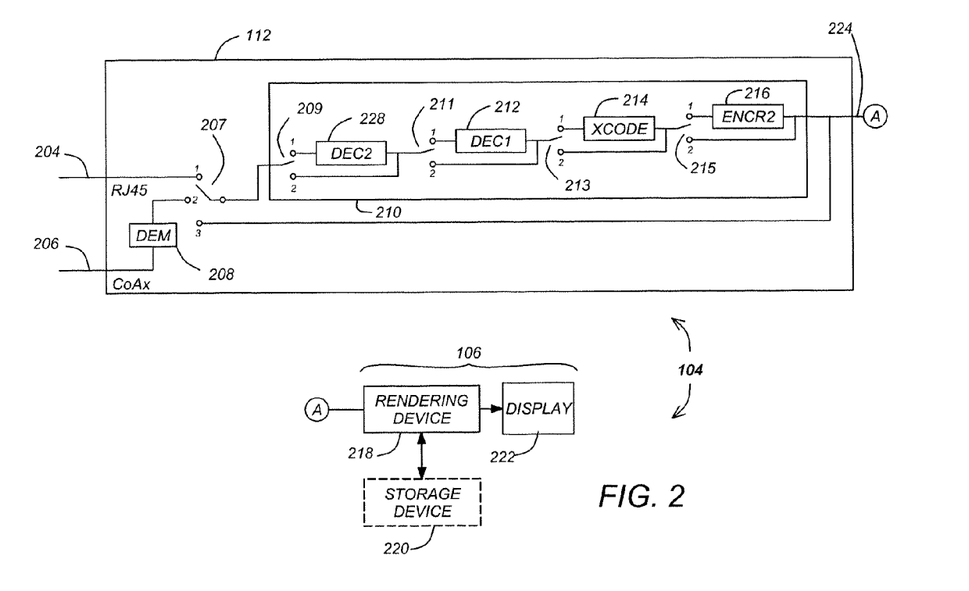
FIG. 2 is a diagram of an exemplary embodiment of a presentation station.

FIG. 2 is a diagram of an exemplary embodiment of a presentation station 104. In the illustrated embodiment, the presentation station 104 includes a rendering device 218 that can be implemented on a personal computer 106 having a display 222. The rendering device 218 may be a personal computer, such as a WINDOWS-based personal computer, a MACINTOSH, or may be an IP device. In one embodiment, the rendering device 218 is a Mac personal computer running QUICKTIME. The rendering device 218 may also be a portable device such as an IPOD or a cellphone with suitable processing and storage capability.

The rendering device 218 may include or be coupled to a storage device 220. In one embodiment, the storage device 222 may be a hard drive incorporated into the personal computer 106. The storage device 220 permits media program data to be stored. Such storage may be long term or permanent (as would be the case if the PMD is stored in its entirety for later viewing) or short term (to support viewing before the entire program is stored or live pause functionality). The storage device 220 may comprise any memory of suitable capacity and store/retrieve speed, including a hard disk drive or electronic memory such as flash memory.

As described above, a processing device 112 can be coupled to the rendering device 218 to permit the PMD data transmitted to the facility 108 to be displayed by the presentation station 108. In a preferred embodiment, the processing device 112 comprises a dongle 112 that can be removably attached to one of the I/O ports of the rendering device 218.

In the illustrated embodiment, the dongle 112 includes a first dongle input 204 which accepts a packetized baseband media data stream that may have been encrypted according to the broadcast encryption standard of the headend 102. In one embodiment, the form factor of the first dongle input 204 is an RJ45 connector. In addition to or in the alternative, the dongle 112 may also comprise a second dongle input 206 that accepts a modulated signal with having the packetized media program data stream. This input may be, for example, a coax system compliant with the data over cable service interface specification (DOCSIS). The signal on input 206 is demodulated by the demodulator 208 before further processing. The PMD may be multiplexed to provide multiple channels of information as well. In which case, the dongle 112 may also include a demultiplexer interposed between switch 207 and switch 209 to demultiplex the packetized media data and obtain the data relevant to the channel(s) of interest.

Switch 207 allows one or more of any of the connectors labeled "1", "2" and "3" to be supplied as an input to the dongle processor 210. Switch 207 (as well as the other switches shown in FIG. 2) may be implemented in software or hardware.

In the illustrated embodiment, the dongle 112 includes a decryptor 212, a transcoder 214 and an encryptor 216, each of which can be enabled to process the incoming signal by application of switches 211, 213 and 215. The dongle 112 also may include a second decryptor 228, that is enabled by application of switch 209 that is used to decrypt the encryption that is performed by encryptor 216, as described further below.

The decryptor 212 is used to decrypt the received PMD (if encrypted) as it is received from the Headend 102.

The transcoder 214 transcodes the PMD from the source codec to the target codec (the codec required by the rendering device 218). Transcoding is a direct digital-to-digital process to convert a signal from one codec to another. Typically, transcoding involves decoding/decompressing the original data to a raw intermediate format (i.e. PCM for audio or YUV for video), in a way that mimics standard playback of the lossy content, and then re-encoding this into the target format. Transcoding may be accomplished by decoding the input bitstream into YUV format using a compatible decoder and then encoding the data using an encoder of a target standard. Alternatively, transcoding can be accomplished by changing the bitstream format from one standard to another without its undergoing the complete decoding and encoding process. Transcoding is described, for example as follows: http://en-.wikipedia.org/wiki/Transcoding, which is hereby incorporated by reference.

Encryptor 216 encrypts the PMD before presenting the output of the dongle 112. The encryptor 216 provides a secure communications link between the dongle 112 and the rendering device 218 by encrypting the messages passing therebetween. This can be established via encryption of messages by a shared private key, public/private key pairs, or any other suitable paradigm that cryptographically couples the dongle 112 to the rendering device 218. This prevents a hacker from monitoring the dongle/rendering device interface 224 to extract the media program data and display or store it in unauthorized ways. In one embodiment, the encryption provided by encryptor 216 differs from the encryption that is applied to the broadcast standard encryption that is applied to the PMD before it is received.

The second decryptor 228 can be used to decrypt PMD that was encrypted by the encryptor 216 and stored on the storage device 220 as described below.

The dongle/rendering device interface 224 may be a USB-compliant interface, Ethernet, or firewire. In one embodiment, interface 224 is a two way digital interface, and therefore, information can be transmitted in both directions at essentially the same time. Further, switches 207, 209, 211, 213, and 215 can be rapidly switched (e.g. between packets) if desired so that the dongle 112 can concurrently process data before storage on the storage device 220 and process data retrieved from the storage device 220. This allows the dongle 112 to support implementations wherein the media stream is being received, processed and stored on the storage device 220 and being received from the storage device 200, processed by the dongle 112 and provided to the rendering device 218 at the same time. This may occur, for example, when the system is used to begin recording of a media program, and playback of the media program commences before the entire media program has been recorded. This may also occur during "live pause" when the playback of a media program is paused while playback of the media program continues.

The dongle 112 can be communicatively coupled to the rendering device 218 via a rendering device I/O port, which can be a serial or parallel interface, and may comprise a wireless interface such as IR. In embodiments wherein the interface is not wireless, the dongle 112 can be attached and removed without need for special tools or disassembly (e.g. removably communicatively coupled).

The functions performed by the decryptor 212, transcoder 214, encryptor 216 and second decryptor 228 may be performed by a single processor and associated coupled memory implemented in a single integrated circuit chip 210, or may be implemented by separate processors, separate chips, or separate hardware modules.

Presentation of PMD in Real Time

The presentation station 104 can be used to decrypt and display streaming media program data in real time, or can be used to receive and store media program data for later playback or other use.

Figure 3:
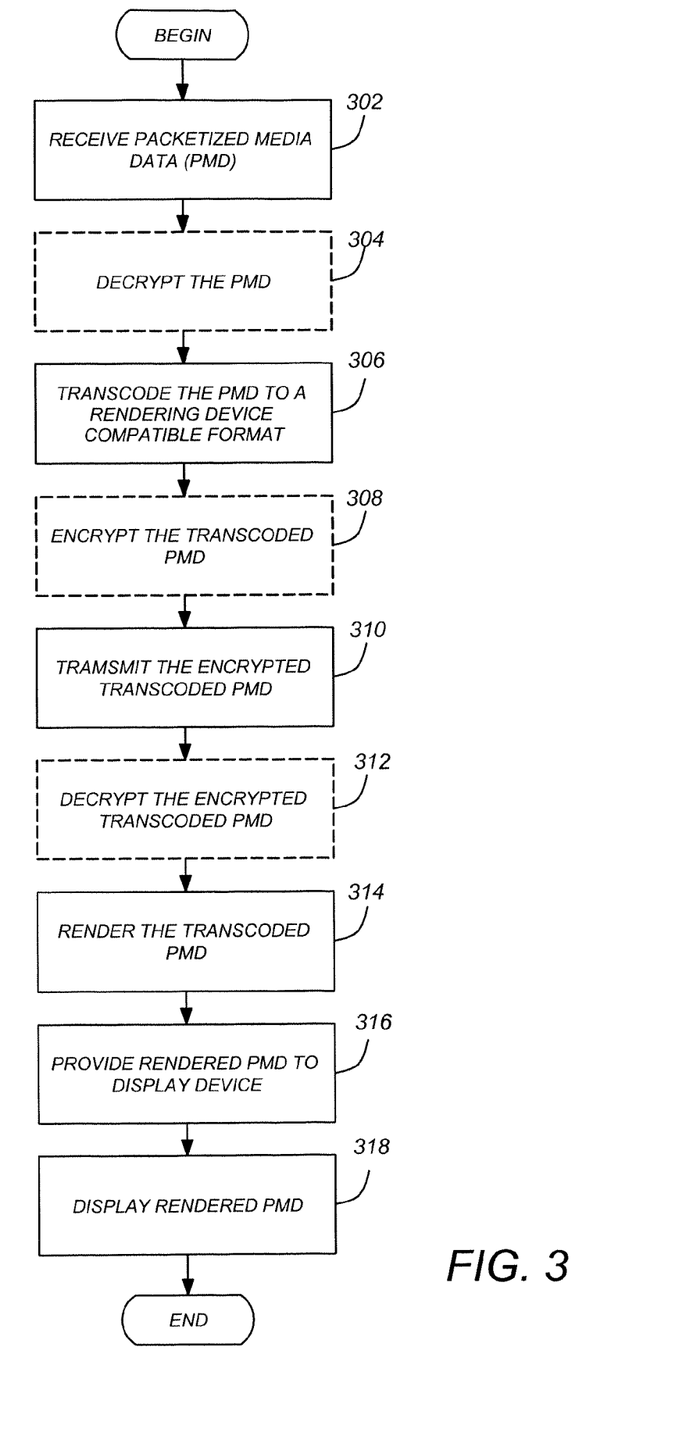
FIG. 3 is a flow chart illustrating representative method steps that can be used to practice an embodiment of the invention in which the packetized media data is presented for display without storage.

FIG. 3 is a flow chart illustrating representative method steps that can be used to practice an embodiment of the invention in which the media program data (PMD) is presented for display without storage. The discussion of FIG. 3 is made with reference to one hardware embodiment that can be used to practice the illustrated method steps, namely, the embodiment described in FIG. 2, in which switches 207, 209, 211, 213 and 215 are in positions (1, 2, 1, 1, 1) respectively.

Referring now to FIG. 3, the PMD is received, as shown in block 302. In one embodiment, the PMD complies with an Internet Protocol (IP) and is encrypted according to a broadcast encryption standard acceptable to the provider of the media program, and may be streaming data. In the embodiment shown in FIG. 2, the PMD is received in the dongle 112 is at baseband (unmodulated) at input 204. Alternatively, the received PMD may modulated, in which case, switch 209 is in position (2).

If the Headend 102 encrypted the PMD, the received PMD may be decrypted to remove the broadcast encryption applied by the Headend 102. This is illustrated in block 304, and may be performed by decryptor 212, illustrated in FIG. 2.

Next, the decrypted PMD is transcoded to transform the program data from the source codec into the target codec (e.g. the codec required by the rendering device 218). This is illustrated in block 306, and can be performed, for example, by transcoder 214 illustrated in FIG. 2.

The transcoded PMD is then optionally encrypted before being transmitted to the rendering device 218. This is illustrated in blocks 308 and 310. In the embodiment shown in FIG. 2, the encryption is performed by encryptor 216 and the encrypted PMD is made available at the output of the dongle 112.

The encrypted PMD is then decrypted, as shown in block 312. In the embodiment illustrated in FIG. 2, the encrypted PMD is decrypted by a decryption module resident in the rendering device 218. The decryption module may be implemented in the software or hardware of the rendering device 218. The encryption and decryption performed by the dongle 112 and the rendering device 218 can be implemented via a shared secret (which could include, for example, a shared value or a shared algorithm), a public/private key pair, or any suitable technique. In one embodiment, the encryption performed by the encryptor 216 uses a different algorithm or key than the than the broadcast standard encryption performed by the Headend, but this need not be the case.

The rendering device 218 then renders the decrypted PMD, as shown in block 314. In one embodiment, the rendering device renders the decrypted PMD using native software and/or hardware elements that are provided with the rendering device upon purchase. Hence, the rendering device can be off-the shelf and neither the hardware nor the software of the rendering device 218 need be modified to perform the task of rendering the PMD.

Finally, as shown in blocks 316 and 318, the rendered PMD is provided to the display device 222, where it is displayed to the user.

Transcoding, Storage and Replay of PMD

Figure 4:
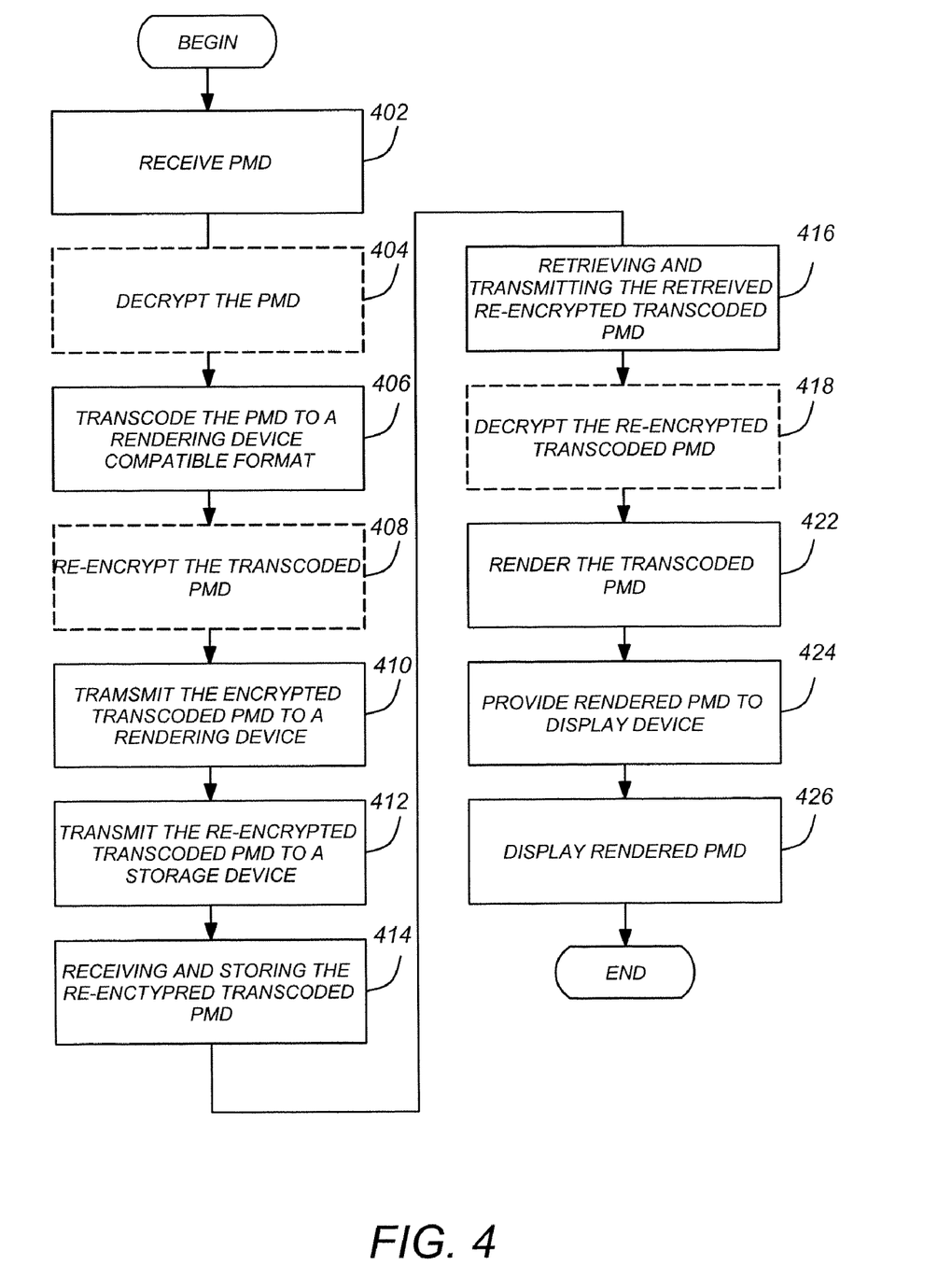
FIG. 4 is a flow chart illustrating representative method steps that can be used to practice an embodiment of the invention in which the packetized media data is stored and thereafter retrieved for display to the user.

FIG. 4 is a flow chart illustrating representative method steps that can be used to practice an embodiment of the invention in which the PMD is stored and thereafter retrieved for display to the user. The discussion of FIG. 4 is made with reference to one hardware embodiment that can be used to practice the illustrated method steps, namely, the embodiment described in FIG. 2, in which switches 207, 209, 211, 213 and 215 are in positions (1, 2, 1, 1, 1) respectively when the PMD is processed before storage in the storage device 220 and in positions (3, 1, 2, 2, 1) when the PMD is retrieved and played back.

Beginning first with storage, a PMD is received, as shown in block 402. This can be accomplished, for example, by the dongle 112. If the PMD was encrypted by the Headend 102, it is decrypted, as shown in block 404. This can be accomplished using the decryptor 212 in FIG. 3. In block 406, the PMD is transcoded from the source codec to the codec of the target (the rendering device 218). This can be accomplished with the transcoder 214 shown in FIG. 2. The transcoded PMD is then re-encrypted, as shown in block 408, and transmitted to the rendering device as shown in block 410. This can be accomplished, for example, by the encryptor 216 shown in FIG. 2.

In blocks 412 and 414, the re-encrypted and transcoded PMD is transmitted to a storage device 220. In the embodiment illustrated in FIG. 2, this is accomplished by transmission via the rendering device 218. However, the data may be transmitted directly to the storage device 220 if desired.

To play back PMD stored in the storage device 220, the PMD need only be retrieved from the storage device 220, decrypted in the rendering device 218, rendered, and provided to the display device 222 for viewing. This is shown in blocks 416-426.

Other embodiments of the foregoing are also envisioned. For example, in one alternative embodiment, the PMD is not decrypted and re-encrypted before being stored. Instead, the PMD decrypted, transcoded, and simply stored unencrypted in the storage device 220. It is then later retrieved and simply provided to the rendering device 218 for rendering and thereafter to the display device 222 for viewing.

Storage of Untranscoded PMD for Later Transcoding and Replay

Figure 5:
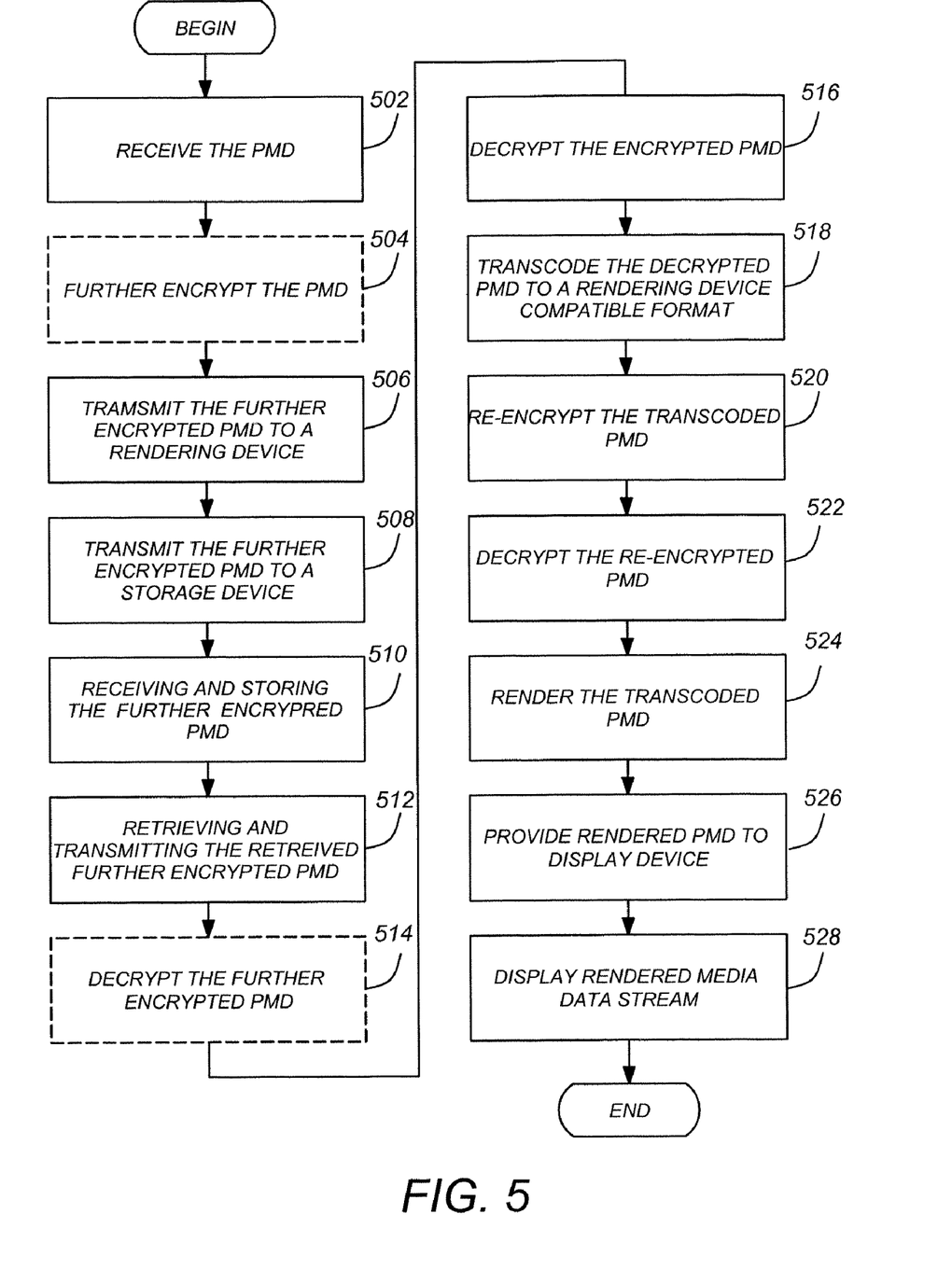
FIG. 5 is a flow chart illustrating alternative method steps that can be used to practice an embodiment of the invention in which the packetized media data is stored and thereafter retrieved for display to the user.

FIG. 5 is a flow chart illustrating alternative method steps that can be used to practice an embodiment of the invention in which the PMD is stored and thereafter retrieved for display to the user. The discussion of FIG. 5 is made with reference to one hardware embodiment that can be used to practice the illustrated method steps, namely, the embodiment described in FIG. 2, in which switches 207, 209, 211, 213 and 215 are in positions (1, 2, 1, 2, 1) respectively when the PMD is processed before storage in the storage device 220 and in positions (3, 1, 2, 1, 1) when the PMD is retrieved and played back.

First, the PMD is received, as shown in block 502. This can be accomplished by the dongle 112. If the PMD is received in encrypted form, it can be simply transmitted to the storage device 222 via the rendering device 218 without further encryption. Or, the PMD can be decrypted by decryptor 212 and re-encrypted by encryptor 216 according to a different encryption algorithm, technique, or seed. Alternatively, the received encrypted PMD can be further secured by further encrypting the received encrypted PMD as shown in block 504. This can be accomplished by encryptor 216.

The further encrypted PMD is then transmitted to the storage device 222, where it is received and stored, as shown in blocks 506-510.

Upon playback, the PMD is retrieved from the storage device 222 and transmitted to the dongle 112 via the rendering device 218. This is shown in block 512.

Upon playback, if the PMD was decrypted and re-encrypted by encryptor 216, the PMD is retrieved from storage, decrypted using decryptor 228 and provided to the transcoder 214 for transcoding. If the received encrypted PMD was further encrypted by the encryptor 216, it is decrypted using decryptor 228 and then further decrypted using decryptor 212 before being provided to the transcoder 214. Finally, if the received encrypted PMD was simply stored on the storage device 220 without further encryption, decryptor 228 is bypassed, and the retrieved PMD is provided to decryptor 212 and thence to the transcoder 214 for transcoding. The embodiment in which the encrypted PMD was further encrypted before storage is illustrated in blocks 514-518.

Before transmitting the transcoded PMD to the rendering device 218, it can be re-encrypted to assure it is not compromised. This can be accomplished by encryptor 216 and is shown in block 520. The transcoded PMD is provided to the rendering device 218, where it is decrypted, rendered, and provided to the display device 222, where it is can be displayed to the user, as described in blocks 522-528.

Since the PMD can be encrypted and decrypted using an identifier unique to the dongle 112 (e.g. by encryptor 216 and decryptor 228), the broadcaster or studio can be assured that the PMD can only be presented if the dongle 112 is attached to the rendering device 218. This would prevent someone from using a different dongle 112 to view the PMD stored in the storage device 220.

In the foregoing discussion, the communication path between the dongle 112 and the rendering device 218 is secured by use of encryption/decryption of messages using private and/or public keys. However, a secured communication link between the dongle 112 and the rendering device 218 may also be established by other means. In one embodiment, a secure communications link is established between the dongle 112 and the rendering device 218 at each session so that the information passed between then would be cryptographically coupled in such a manner to prevent unauthorized reception of the signal. This could be established using a number of different paradigms, including secure sockets layer (SSL) and similar technologies.

Hardware Environment

Figure 6:
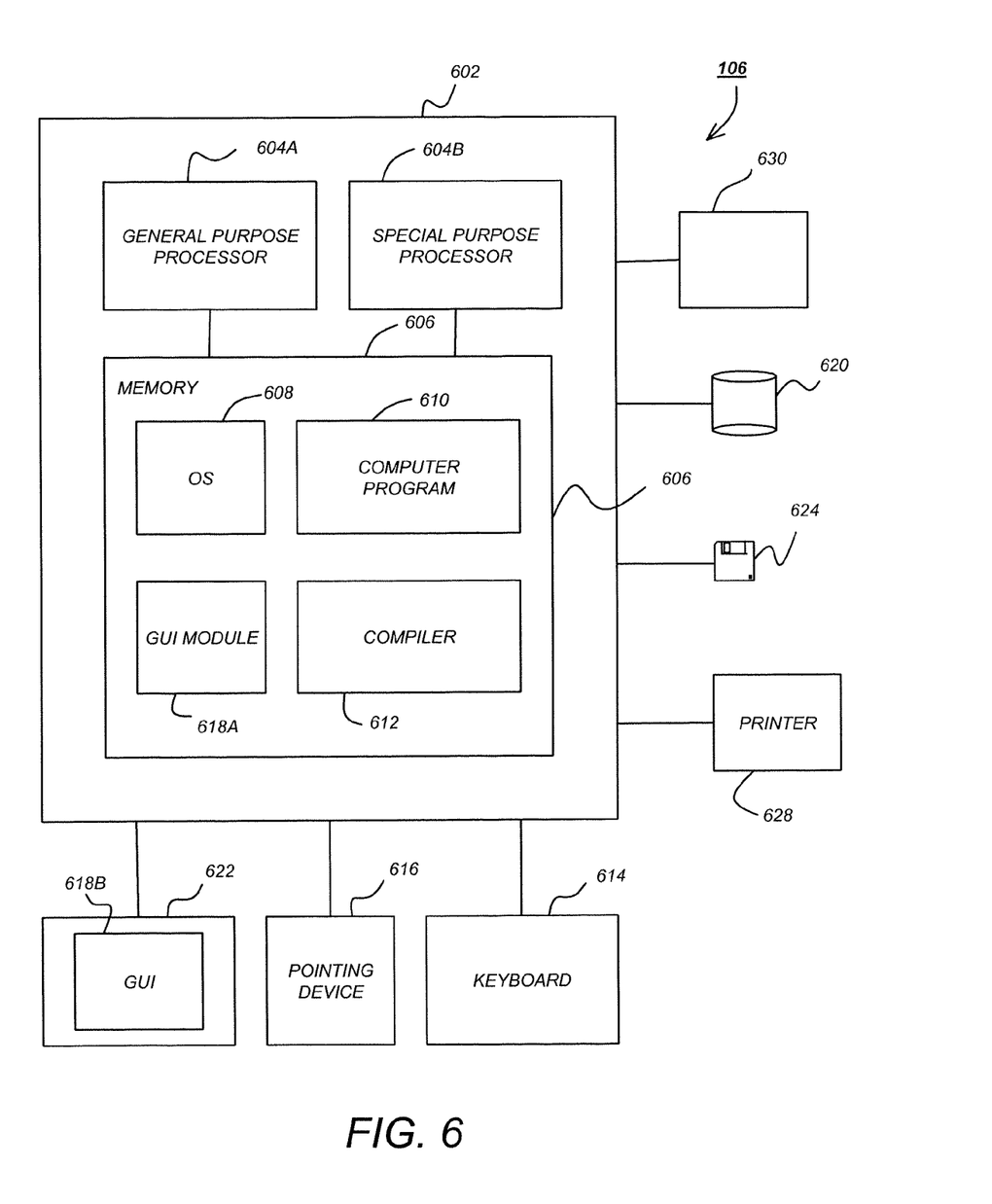
FIG. 6 is a diagram illustrating one embodiment of a rendering device.

FIG. 6 illustrates an exemplary computer system 602 that could be used to implement elements the present invention, including the rendering device 218 and/or selected portions of the dongle 112. The computer 602 comprises a general purpose hardware processor 604A and/or a special purpose hardware processor 604B (hereinafter alternatively collectively referred to as processor 604) and a memory 606, such as random access memory (RAM). The computer 602 may be coupled to other devices, including input/output (I/O) devices such as a keyboard 614, a mouse device 616 and a printer 628.

In one embodiment, the computer 602 operates by the general purpose processor 604A performing instructions defined by the computer program 610 under control of an operating system 608. The computer program 610 and/or the operating system 608 may be stored in the memory 606 and may interface with the user 132 and/or other devices to accept input and commands and, based on such input and commands and the instructions defined by the computer program 610 and operating system 608 to provide output and results.

Output/results may be presented on the display 622 or provided to another device for presentation or further processing or action. Typically, the display 622 comprises a plurality of picture elements (pixels) that change state to collectively present an image to the user 132. For example, the display 622 may comprise a liquid crystal display (LCD) having a plurality of separately addressable pixels, each with a liquid crystal that changes to an opaque or translucent state to form a part of the image on the display in response to the data or information generated by the processor 604 from the application of the instructions of the computer program 610 and/or operating system 608 to the input and commands. Similarly, plasma displays include a pixel having three separate subpixel cells, each with a different color phosphor. The colors blend together to create the color presented in the pixel. Pulses of current flowing through the cells are varied according to the data generated by the processor from the application of the instructions of the computer program and/or operating system 608 in response to input and commands, changing the intensity of the light provided by the pixel. Also, similarly, cathode ray tube (CRT) displays include a plurality of pixels, each with each pixel having subpixels typically represented by dots or lines from an aperture grille. Each dot or line includes a phosphor coating that glows when struck by electrons from an electron gun. In response to the data generated by the processor from the application of instructions of the computer program and/or operating system 608 and in response to input and commands, the electrons emitted by the electron gun are steered at the dots or lines, thus changing the state of the associated pixel by causing the phosphor coating of that dot or line to glow.

The image may be provided through a graphical user interface (GUI) module 618A. Although the GUI module 618A is depicted as a separate module, the instructions performing the GUI functions can be resident or distributed in the operating system 608, the computer program 610, or implemented with special purpose memory and processors.

Some or all of the operations performed by the computer 602 according to the computer program 110 instructions may be implemented in a special purpose processor 604B. In this embodiment, the some or all of the computer program 610 instructions may be implemented via firmware instructions stored in a read only memory (ROM), a programmable read only memory (PROM) or flash memory in within the special purpose processor 604B or in memory 606. The special purpose processor 604B may also be hardwired through circuit design to perform some or all of the operations to implement the present invention. Further, the special purpose processor 604B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 602 may also implement a compiler 612 which allows an application program 610 written in a programming language such as COBOL, C++, FORTRAN, or other language to be translated into processor 604 readable code. After completion, the application or computer program 610 accesses and manipulates data accepted from I/O devices and stored in the memory 606 of the computer 602 using the relationships and logic that was generated using the compiler 612.

The computer 602 also optionally comprises an external communication device such as a modem, satellite link, Ethernet card, or other device for accepting input from and providing output to other computers.

In one embodiment, instructions implementing the operating system 608, the computer program 610, and the compiler 612 are tangibly embodied in a computer-readable medium, e.g., data storage device 620, which could include one or more fixed or removable data storage devices, such as a zip drive, floppy disc drive 624, hard drive, CD-ROM drive, tape drive, etc. Further, the operating system 608 and the computer program 610 are comprised of computer program instructions which, when accessed, read and executed by the computer 602, causes the computer 602 to perform the steps necessary to implement and/or use the present invention or to load the program of instructions into a memory, thus creating a special purpose data structure causing the computer to operate as a specially programmed computer executing the method steps described herein. Computer program 610 and/or operating instructions may also be tangibly embodied in memory 606 and/or data communications devices 630, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 602.

Although the term "computer" is referred to herein, it is understood that this computer 600 may include portable devices such as cellphones, portable MP3 players, video game consoles, notebook computers, pocket computers, or any other device with suitable processing, communication, and input/output capability.

Similarly, the dongle processor 210 may include one or more general purpose or special purpose processors communicatively coupled to a memory for storing instructions that are executed by the dongle processor(s) 210 to perform the functions described above. Decryptors 228, 212, transcoder 214, and encryptor 216 may be implemented by a single processor or by multiple processors. Further, switches 207, 209, 211, 213 and 215 may be electronic switches, mechanical switches, or switches implemented using instructions performed by the processor(s).

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of transcoding packetized media data (PMD) for a personal computer-based rendering device for presentation on a display, comprising the steps of:
 receiving, in a dongle removably coupled to the rendering device, the PMD encrypted according to a first encryption technique complying with a broadcast encryption standard;
 further encrypting, in the dongle, the encrypted PMD, according to a second encryption technique;
 transmitting the further encrypted PMD from the dongle to the rendering device;
 receiving the further encrypted PMD in the dongle;
 decrypting, in the dongle, the further encrypted PMD to produce the received encrypted PMD;
 decrypting, in the dongle, the received encrypted PMD to produce decrypted PMD;
 transcoding, in the dongle, the decrypted PMD into a rendering device-compatible format;
 encrypting, in the dongle, the transcoded PMD according to a second encryption technique using an identifier unique to the dongle; and
 transmitting the encrypted and transcoded PMD from the dongle to the rendering device having a decryptor configured to decrypt the encrypted and transcoded PMD to produce the decrypted PMD.

2. The method of claim 1, further comprising the steps of:
 receiving the encrypted and transcoded PMD in the rendering device;
 rendering the transcoded PMD in the rendering device;
 providing the rendered transcoded PMD to a display; and
 displaying the rendered transcoded PMD.

3. The method of claim 1 wherein:
 the PMD is multiplexed to provide a plurality of channels;
 the method further comprises the step of demultiplexing the encrypted PMD in the dongle; and
 the step of transcoding, in the dongle, the decrypted PMD into a rendering device compatible format comprises the step of transcoding, in the dongle, the demultiplexed and decrypted PMD into a rendering device compatible format.

4. The method of claim 1, wherein:
 the encrypted PMD is modulated;
 the method further comprises the step of demodulating the encrypted PMD; and
 the step of further encrypting, in the dongle, the encrypted PMD according to a second encryption technique comprises the step of further encrypting, in the dongle, the demodulated PMD to provide the decrypted media stream.

5. The method of claim 1, further comprising the steps of:
 transmitting the encrypted and transcoded PMD to a storage device;
 retrieving the encrypted and transcoded PMD from the storage device;
 decrypting the retrieved encrypted and transcoded PMD;

rendering the decrypted retrieved PMD;
providing the rendered PMD to a display; and
displaying the rendered PMD.

6. The method of claim 1, wherein the dongle further encrypts the encrypted PMD according to an identifier unique to the dongle.

7. The method of claim 2, wherein the transcoded PMD is rendered by a personal computer and displayed on a display communicatively coupled to the personal computer.

8. A method of transcoding packetized media data (PMD) for a personal computer-based rendering device for presentation on a display, comprising the steps of:
(a) receiving, in a dongle removably coupled to the rendering device, the PMD encrypted according to a first encryption technique complying with a broadcast encryption standard;
(b) further encrypting, in the dongle, the encrypted PMD according to a second encryption technique to produce a further encrypted PMD;
(c) storing the further encrypted PMD in a storage device;
(d) retrieving the further encrypted PMD from the storage device;
(e) decrypting, in the dongle, the retrieved further encrypted PMD to produce the encrypted PMD;
(f) decrypting, in the dongle, the encrypted PMD to produce a decrypted PMD;
(g) transcoding, in the dongle, the decrypted PMD into a rendering device compatible format;
(h) encrypting, in the dongle, the transcoded PMD according to the second encryption technique using an identifier unique to the dongle; and
(i) transmitting the encrypted transcoded PMD to the rendering device.

9. The method of claim 8, further comprising the steps of:
decrypting, in the rendering device, the encrypted transcoded PMD;
rendering the decrypted transcoded PMD;
providing the rendered transcoded PMD to a display; and
displaying the rendered transcoded PMD.

10. The method of claim 8, wherein:
the received encrypted PMD is multiplexed to provide a plurality of channels;
the method further comprises the step of demultiplexing the received encrypted PMD in the dongle; and
the step of storing the further encrypted PMD in the storage device comprises the step of storing the demultiplexed encrypted PMD in the storage device.

11. The method of claim 8, wherein:
the received encrypted PMD is modulated;
the method further comprises the step of demodulating the received encrypted PMD; and
the step of further encrypting, in the dongle, the encrypted PMD according to a second encryption technique comprises the step of further encrypting, in the dongle, the demodulated encrypted PMD to produce the further encrypted PMD;
the step of storing the further encrypted PMD in the storage device comprises the step of storing the further encrypted PMD in the storage device.

12. The method of claim 8, wherein the dongle further encrypts the encrypted PMD according to an identifier unique to the dongle.

13. The method of claim 8, wherein the storage device is disposed in the rendering device.

14. The method of claim 8, wherein the storage device is disposed in the dongle.

15. The method of claim 9, wherein the transcoded PMD is rendered by a personal computer and displayed on a display communicatively coupled to the personal computer.

16. The method of claim 15, wherein:
the method further comprises the steps of:
(j) receiving, in the dongle, additional encrypted PMD, the additional PMD encrypted according to the first encryption technique;
(k) further encrypting, in the dongle, the additional encrypted PMD according to the second encryption technique; and
(l) transmitting the further encrypted additional PMD from the dongle to the rendering device;
wherein steps (d)-(i) are performed concurrently with steps (j)-(l).

17. An apparatus for transcoding a packetized media data (PMD), comprising:
a dongle, removably coupleable to the rendering device, having:
a first dongle input for selectably receiving the PMD encrypted according to a first encryption complying with a broadcast encryption standard and a further encrypted PMD, the further encrypted PMD encrypted according to a second encryption;
an encryptor, for selectably further encrypting the encrypted PMD according to the second encryption to produce the further encrypted PMD and encrypting a transcoded decrypted PMD using an identifier unique to the dongle;
a first decryptor for selectably decrypting the further encrypted PMD to produce the encrypted PMD;
a second decryptor for selectably decrypting the encrypted PMD to provide decrypted PMD;
a transcoder, for selectably transcoding the decrypted PMD into a rendering device-compatible format to produce the transcoded decrypted PMD.

18. The apparatus of claim 17, wherein the received encrypted PMD is multiplexed to provide a plurality of channels and the dongle further comprises a demultiplexer, coupled between the second decryptor and the transcoder for demultiplexing the decrypted media data stream.

19. The apparatus of claim 17, wherein the dongle further comprises:
a second dongle input for receiving a modulated second Internet Protocol (IP) PMD complying with the broadcast encryption standard; and
a demodulator, coupled to the second dongle input and selectably providing a demodulated second PMD complying with the broadcast encryption standard to the first decryptor input.

20. The apparatus of claim 19, wherein the rendering device is a personal computer.

21. The apparatus of claim 17, wherein the second encryption comprises private key cryptography.

22. The apparatus of claim 17, wherein the second encryption comprises public key cryptography.

23. The apparatus of claim 17, further comprising:
a storage device, for receiving and storing the further encrypted PMD.

24. The apparatus of claim 17, wherein the rendering device is a personal computer.

* * * * *